(12) United States Patent
Bolcer et al.

(10) Patent No.: US 8,595,815 B2
(45) Date of Patent: Nov. 26, 2013

(54) SYSTEM AND METHOD FOR SELECTIVELY GRANTING ACCESS TO DIGITAL CONTENT

(76) Inventors: Gregory Alan Bolcer, Yorba Linda, CA (US); Clay H. Cover, Anaheim, CA (US)

( * ) Notice: Subject to any disclaimer, the term of this patent is extended or adjusted under 35 U.S.C. 154(b) by 1314 days.

(21) Appl. No.: 11/828,597

(22) Filed: Jul. 26, 2007

(65) Prior Publication Data

US 2008/0028208 A1 Jan. 31, 2008

Related U.S. Application Data

(60) Provisional application No. 60/833,417, filed on Jul. 26, 2006, provisional application No. 60/833,410, filed on Jul. 26, 2006, provisional application No. 60/833,537, filed on Jul. 26, 2006, provisional application No. 60/833,457, filed on Jul. 26, 2006, provisional application No. 60/833,411, filed on Jul. 26, 2006, provisional application No. 60/833,468, filed on Jul. 26, 2006, provisional application No. 60/833,413, filed on Jul. 26, 2006, provisional application No. 60/833,420, filed on Jul. 26, 2006, provisional application No. 60/833,419, filed on Jul. 26, 2006, provisional application No. 60/833,536, filed on Jul. 26, 2006.

(51) Int. Cl.
*G06F 7/04* (2006.01)

(52) U.S. Cl.
USPC ............ 726/10; 726/1; 726/2; 726/3; 726/4; 726/5; 713/156; 713/157; 713/158

(58) Field of Classification Search
USPC ................................ 726/1–21; 713/156–158
See application file for complete search history.

(56) References Cited

U.S. PATENT DOCUMENTS

| | | | |
|---|---|---|---|
| 7,043,050 B2 | 5/2006 | Yuval | |
| 2002/0002674 A1* | 1/2002 | Grimes et al. | 713/156 |
| 2003/0007640 A1* | 1/2003 | Harada et al. | 380/270 |
| 2003/0191936 A1* | 10/2003 | Kawatsura et al. | 713/156 |
| 2004/0030887 A1* | 2/2004 | Harrisville-Wolff et al. | 713/155 |
| 2004/0083391 A1 | 4/2004 | De Jong | |
| 2004/0098592 A1* | 5/2004 | Taki | 713/176 |
| 2004/0186996 A1* | 9/2004 | Gibbs et al. | 713/168 |
| 2004/0187154 A1* | 9/2004 | Wasilewski | 725/60 |
| 2007/0179895 A1* | 8/2007 | Bishop et al. | 705/51 |

* cited by examiner

*Primary Examiner* — Taghi Arani
*Assistant Examiner* — Roderick Tolentino
(74) *Attorney, Agent, or Firm* — Paul D. Chancellor; Jackson, DeMarco, Tidus & Peckenpaugh

(57) ABSTRACT

The present invention relates to a system and method for granting access to digital content delivered via a computer network wherein a suitable digital certificate provides a means for providing authorization to access the requested digital content.

27 Claims, 13 Drawing Sheets

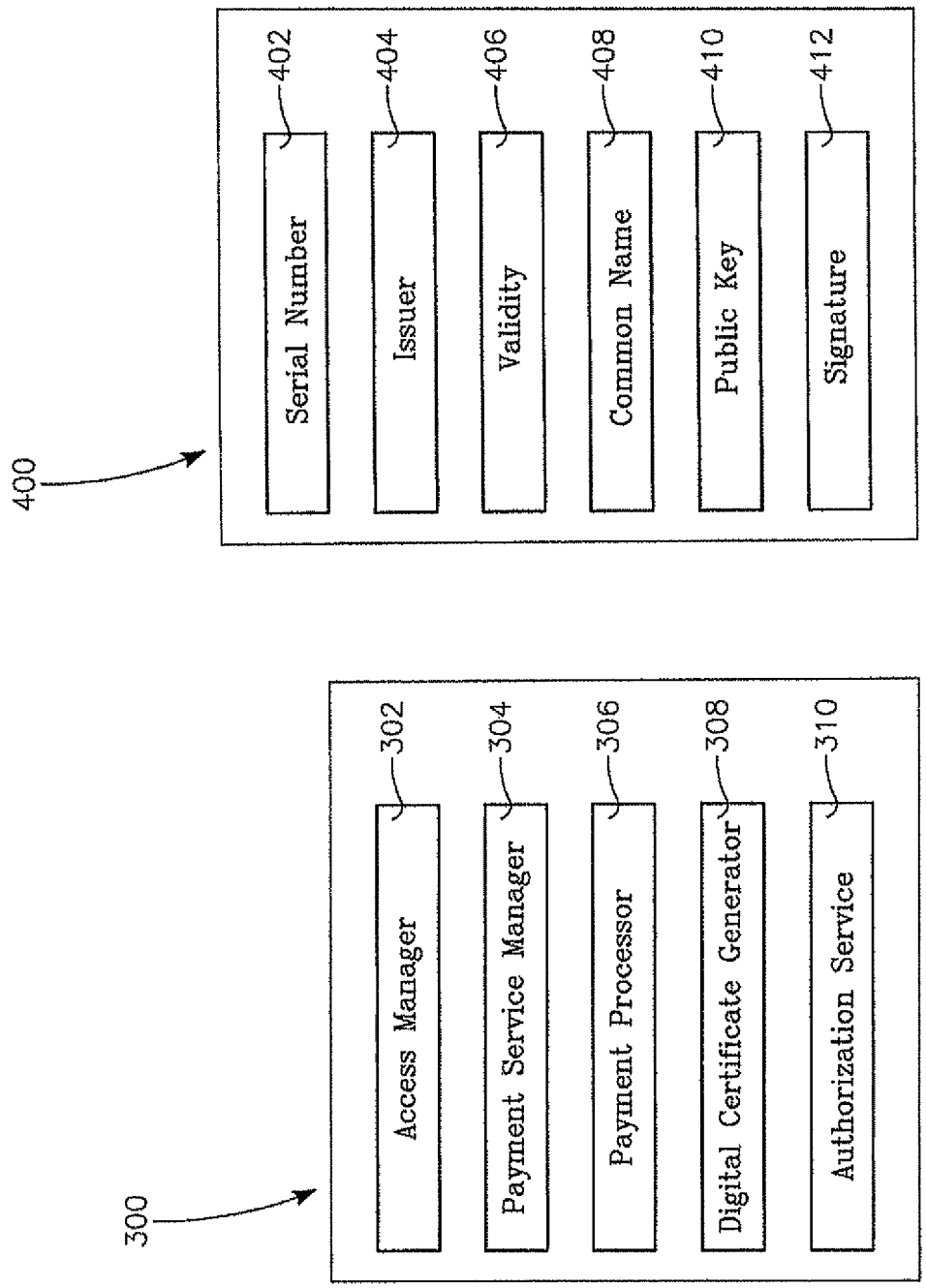

SYSTEM AND METHOD FOR SELECTIVELY GRANTING ACCESS TO DIGITAL CONTENT

This application claims the benefit of and incorporates by reference U.S. Provisional Pat. Appl Nos. 60/833,417, 60/833,410, 60/833,537, 60/833,457, 60/833,411, 60/833,468, 60/833,413, 60/833,420, 60/833,419, and 60/833,536, all of which were filed on Jul. 26, 2006.

BACKGROUND OF THE INVENTION

1. Field of the Invention

The present invention relates to a system and method for granting access to digital content delivered via a computer network. In particular, the invention relates to the use of a digital certificate as a means for providing authorization to access requested digital content.

2. Discussion of the Related Art

Digital certificates having prescribed data fields are used to authenticate clients and servers and in association with cryptographic key pairs used for authentication and communications privacy. After they are created and signed by a trusted entity, they are stored. When or even whether such certificates will be used is unknown.

When a digital certificates is called for, a search is made and the certificate is used if found. Where the desired digital certificate is not found, the ongoing authentication or other process is aborted. In other cases, where a prescribed digital certificate parameter searched on matches a plurality of stored certificates, current automatic certificate selection routines will return the first discovered certificate, irrespective of whether it is the desired certificate.

Present digital certificate usage rests on these principles. For these reasons, software vendors instruct users to obtain standardized digital certificates from certificate authorities prior to initiating processes where they will be required and to avoid storage of certificates that creates the potential for automatic selection of the wrong certificate.

SUMMARY OF THE INVENTION

In the present invention, digital certificates unlike those used previously enable access to particular digital content requested by a user. New search means adapted to find individual ones of the new certificates prevents the wrong certificate from being returned. Where no suitable digital certificate is found, the process is not automatically aborted. Rather, a certificate generator contemporaneously creates a suitable digital certificate where proof exists that a required action has been taken for the benefit of the user.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

FIG. 3 is a block diagram of applications and/or services that may be used in connection with the system and method of FIG. 1.

FIG. 4 is a block diagram of data of a digital certificate that may be used in connection with the system and method of FIG. 1.

DESCRIPTION OF THE PREFERRED EMBODIMENTS

The disclosure provided in the following pages describe examples of some embodiments of the invention. The designs, figures, and description are non-limiting examples of certain embodiments of the invention. For example, other embodiments of the disclosed systems and methods may or may not include the features described herein. Moreover, disclosed advantages and benefits may apply to only certain embodiments of the invention and should be not used to limit the disclosed inventions.

The present invention utilizes a digital certificate in selectively granting access to digital content. Included in the invention is a plurality of computers interconnected by a network and a method for granting access to requested digital content after a suitable digital certificate or an HTTP cookie containing one is found or created.

Figure 1:
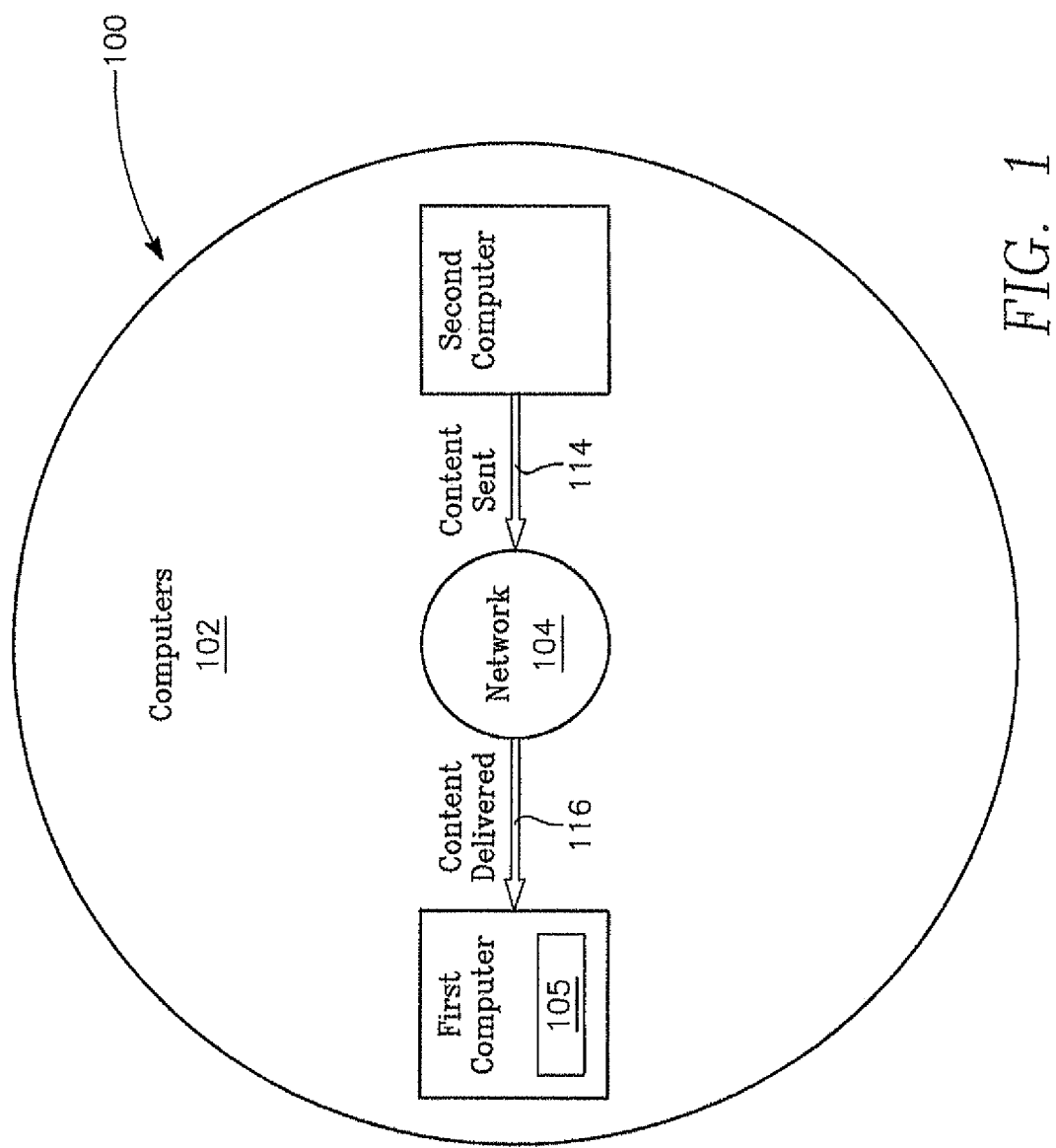
FIG. 1 is a diagram of a system and method for selectively granting access to digital content in accordance with the present invention.

FIG. 1 shows a system and method for selectively granting access to digital content in accordance with the present invention 100. One or more networks 104 interconnect a plurality of computers 102. When a request for content is initiated 105 by a first computer of the plurality, a second computer of the plurality sends and the network delivers 114, 116 the requested content to the first computer after a suitable digital certificate or an HTTP cookie containing one is found or created.

As used herein, computer means any digital device suitable for performing the described functions including personal computers, server computers, personal digital assistants, cell phones, other digital devices and the like; network means one or more digital networks or systems of networks including local and/or remote networks and wired and/or wireless networks; and, digital certificate means any data file, set or assembly containing a cryptographic key.

FIGS. 2a-d show various embodiments of the present invention 200a-d. Each of these figures shows a network 104 interconnecting a user computer 202 and one or more other computers 204. As used herein, user computer includes, unless otherwise indicated by the context, any of the digital devices described above and any combination of the digital device and a particular user. For example, a first user computer is computer 1 with user 1 logged on and a second user computer is computer 1 with user 2 logged on.

Figure 2A:
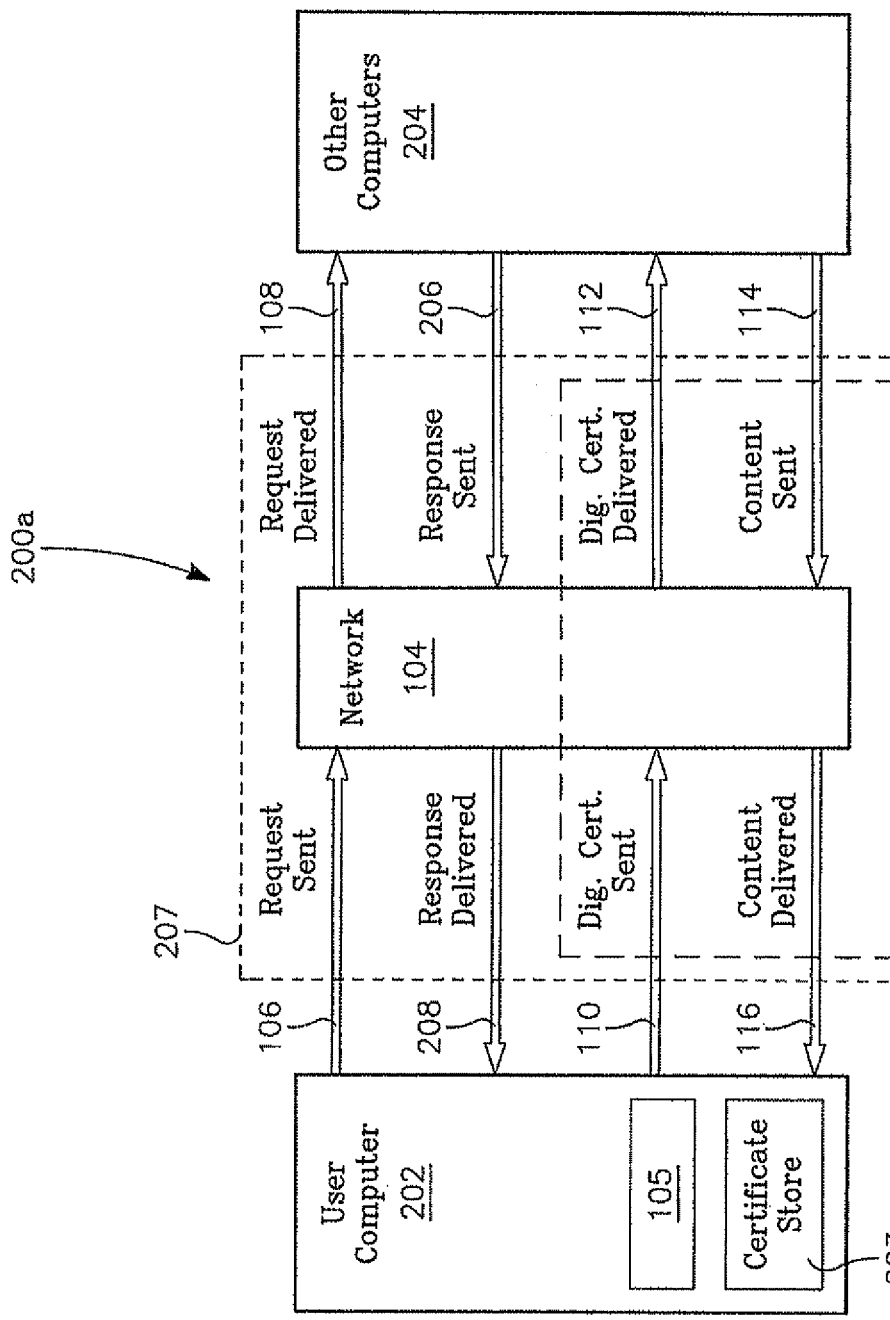
FIG. 2a is a diagram of a first embodiment of the system and method of FIG. 1.

In FIG. 2a, a suitable digital certificate resides in a certificate store 203 on the user computer prior to the initiation of a request for particular content 105. The specification of a suitable digital certificate may be obtained through either of a prompted fetch 207 or an unprompted fetch 209. In the case of a prompted fetch, a request is initiated on the user computer 105, sent by the user computer 106 and delivered 108 by the network to at least one of the other computers 204. Whether a suitable digital certificate is discovered or contemporaneously created, a specification of the digital certificate identifying the requested content is in various embodiments used in the digital certificate search or alternatively in its creation.

In response to the user request, one of the other computers 204 sends a response that is delivered via the network 206,208 to the user computer. The response, alone or in combination with other information available to the user computer 202, indicates parameters of a suitable digital certificate such as a specification of the requested content. Based on these parameters, the user computer selects and sends a suitable digital certificate that is delivered via the network 110,112 to one of the other computers 204 which, upon accepting the certificate, causes the digital content to be sent and delivered via the network 114, 116 to the user computer. As will be discussed further below, a digital certificate will be accepted if it is a suitable digital certificate.

In the case of an unprompted fetch 209, the user request 106,108 is not sent to another computer and the response 206,208 is not sent to the user computer 202. Rather, information on the user computer pointed to when a request is initiated 105 indicates, alone or in combination with other information available to the user computer, parameters of a suitable digital certificate such as a specification of the requested content. Based on these parameters, the user computer 202 selects a suitable digital certificate from its certificate store 203. It then sends and the network delivers 110,112 the digital certificate to one of the other computers 204 which, upon accepting the certificate, causes the digital content to be sent and delivered via the network 114, 116 to the user computer.

For example, in an embodiment having a browser running on the user computer, HTTP link(s) displayed by the browser provide a means for initiating requests for particular content 105. Selecting the link identifies web page source code which directly or indirectly provides a pointer such as a URL and/or a detailed path to the requested content. This pointer information provides the user computer 202 with the information necessary to specify a suitable digital certificate.

In some embodiments, the user computer's search for a digital certificate includes searching locations other than the certificate store of the user computer 203. Such other locations include one or more locations of the user computer and the other computers 204. Where a suitable digital certificate exists for the benefit of the user computer, its discovery and delivery to another computer 204 which accepts it causes the digital content to be sent and delivered via the network 114, 116 to the user computer 202.

Figure 2B:
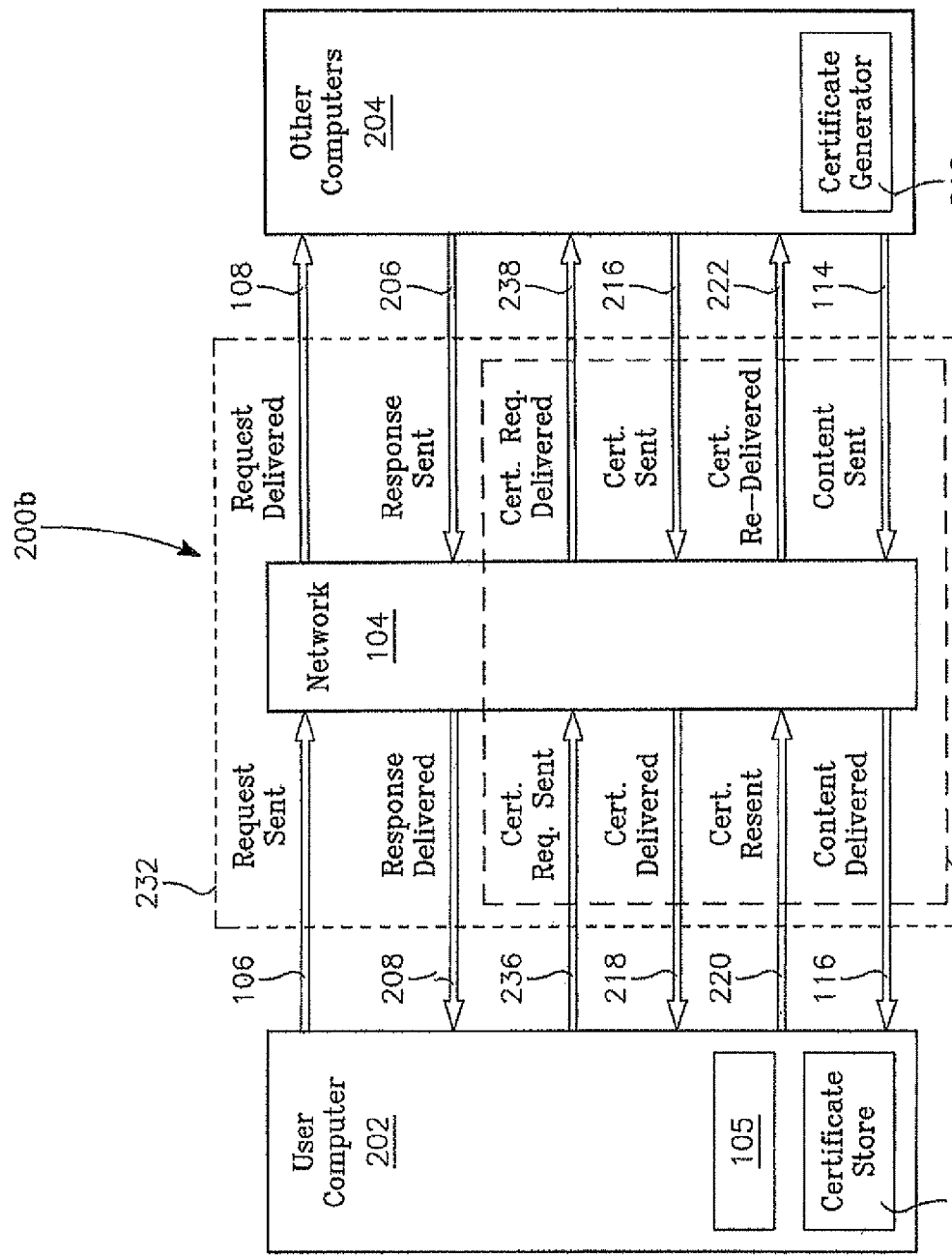
FIG. 2b is a diagram of a second embodiment of the system and method of FIG. 1.

In FIG. 2b a suitable digital certificate is not available to the user computer 202 prior to that computer's initiating a request for particular content 105. Here, as described above, the specification of a suitable digital certificate is obtained by the user computer through either of a prompted 232 or an unprompted 234 fetch. Upon finding that no suitable certificate is available, the user computer sends and the network delivers 236,238 a certificate request to at least one of the other computers 204. Responding to the request for a suitable certificate, one of the other computers 204 creates a suitable certificate which it sends and the network delivers 216, 218 to the user computer. An image of the certificate is saved in the user computer's certificate store 203. The user computer resends and the network redelivers 220, 222 the certificate to one of the other computers which, upon accepting the certificate, causes the requested content to be sent and delivered via the network 114, 116 to the user computer 202.

In another embodiment a suitable digital certificate is not available to the user computer 202 prior to the initiation of a request for particular content 105. Here, the user computer does not receive and resend a suitable digital certificate; rather, the certificate is created and stored by one or more of the other computers 204 for the benefit of the user computer.

Figure 2C:
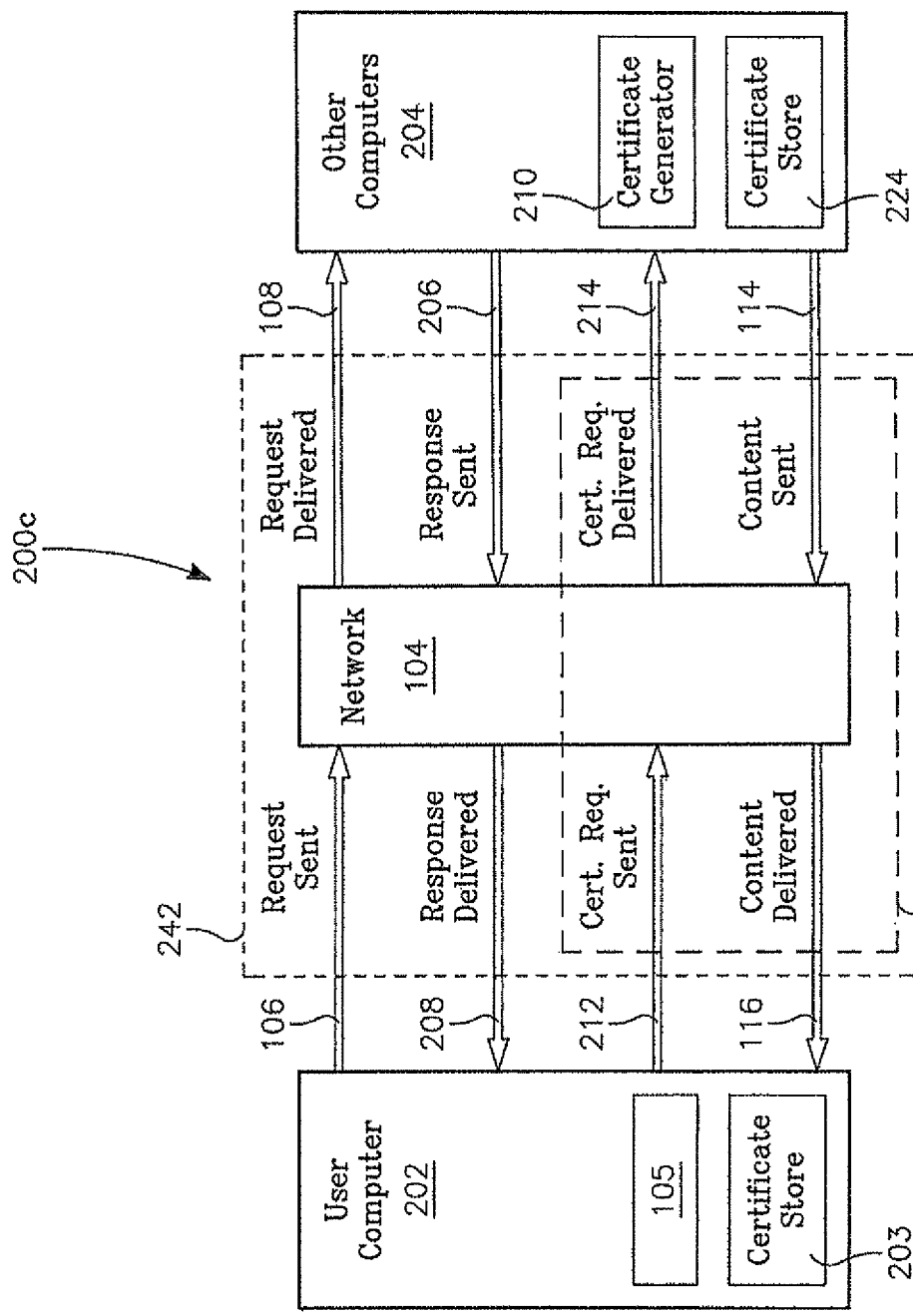
FIG. 2c is a diagram of a third embodiment of the system and method of FIG. 1.

For example, in FIG. 2c the specification of a suitable digital certificate may be obtained by either of a prompted 242 or an unprompted fetch 244 where the certificate request 106, 108 and certificate creation take place as described above. But here, the newly created certificate is stored in a certificate store 224 of one of the other computers 204 for the benefit of the user computer. When one of the other computers can verify that a suitable certificate exists for the benefit of the user computer, it causes the requested content to be sent and delivered via the network 114, 116 to the user computer 202.

Figure 2D:
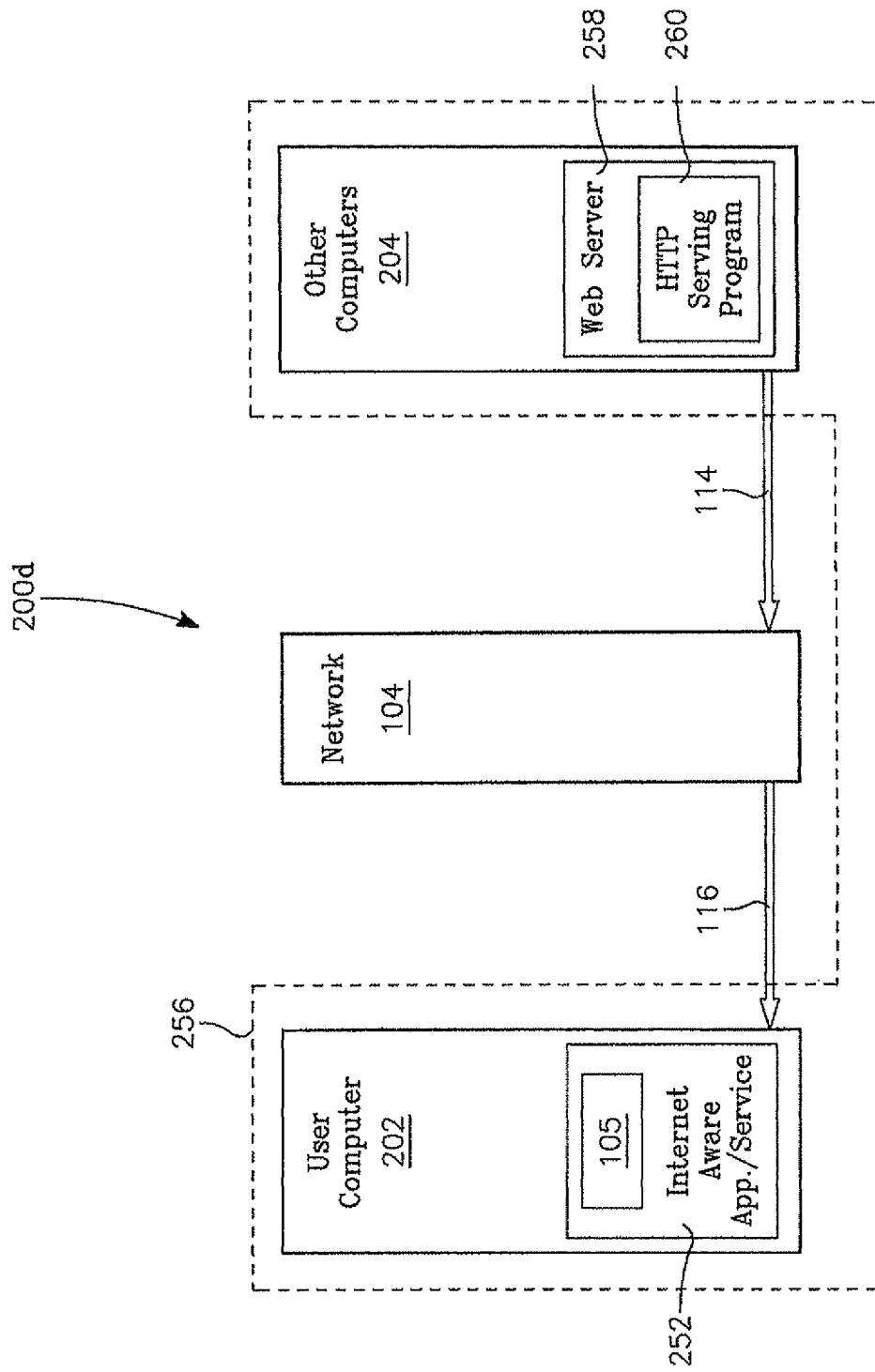
FIG. 2d is a diagram of a fourth embodiment of the system and method of FIG. 1.

FIG. 2d shows applications and/or services included in an embodiment of the present invention 200d. Here, a network aware application or service 252 running on the user computer is operable to initiate requests 105 for particular content. In various embodiments, the network aware application is a browser, another HTTP enabled application such as email or a media player, an FTP facility, or a special purpose service or application such as one designed to deliver stock market prices or real estate brokerage information.

When a request is initiated 105, the specification of a suitable digital certificate is obtained by the user computer 202 through either of a prompted or an unprompted fetch as described above (see also FIGS. 2a-c). Where a certificate is delivered to and accepted by another computer 204, that computer causes the requested content to be sent 114 and delivered via the network 116 to the user computer. In an embodiment (as shown), the other computer is a web server 258 running an HTTP serving program 260 such as Apache HTTP server, Microsoft Internet Information Services (IIS) or Sun Java System Web Server.

Where there is no suitable digital certificate on the user computer 202 or available elsewhere for the benefit of the user computer, satisfaction means 256 for obtaining a suitable digital certificate must be provided.

FIG. 3 shows an embodiment 300 of a satisfaction means 256 including applications and/or services running on one or more of the user computer 202 and the other computers 204. An access manager 302 searches for a suitable digital certificate, a payment services manager 304 presents payment requests to and accepts evidence of payments from a payment processor 306, a digital certificate generator 308 creates a suitable digital certificate for granting access to the requested content 105, and an authorization service 310 provides proof that a required action was taken. In various embodiments, any two or more of these items may be combined and in some embodiments any one or more of these items may be further subdivided. In still other embodiments, less than all of these items may be implemented as the satisfaction means.

In an embodiment, the access manager 302 is embodied in computer code that monitors internet traffic between the user computer 202 and another computer 204. The access manager intercepts certain traffic for processing. Processing by the access manager includes searching for a suitable digital certificate and managing the acquisition of a new digital certificate when the search does not discover a suitable digital certificate. In the case of a prompted fetch, the access manager 302 searches for a suitable digital certificate based on a specification indicated by a response 208. In the case of an unprompted fetch, the access manager 302 searches for a suitable digital certificate based on a specification indicated by source code implementing the request initiation feature or HTTP link.

In an embodiment, the access manager code is located in user computer memory. It may be implemented as a proxy, secure proxy, layered service provider or as another suitable internet traffic intercepting service known in the art. Where implemented as a proxy, the access manager intercepts client browser connections and redirects then through the proxy which is able to modify inbound and outbound internet traffic. Where implemented as a layered service provider ("LSP"), at least a portion of the access manager code resides in the TCP/IP stack. The LSP code is able to intercept and modify inbound and outbound internet traffic. A user computer 202 located access manager is therefore inserted in the communications path between the browser and the internet for purposes including of one or more of intercepting, analyzing and processing communications to and from the browser.

For example, in an embodiment where the access manager has access to a list of Web addresses to be intercepted, only internet traffic received from a listed Web address is processed by the access manager. The use of such a list of Web addresses supports implementation of the unprompted fetch of a digital certificate discussed earlier. In another embodiment, internet traffic is processed by the access manager only where some indicia of the traffic indicates that processing by the access manager is required. The selection of appropriate indicia indicating particular traffic is to be intercepted supports implementation of the prompted fetch of a digital certificate discussed earlier.

It is not required that the access manager 302 be located on the user computer. It may be located on any one or more of the other computers 204 as will be more fully described below.

The access manager 302 interacts with the payment services manager 304 and the payment services manager interacts with the payment processor 306. In some embodiments the price or an indication of the price of the requested access is embodied in the specification of the requested content. In other embodiments the access manager obtains a price for access to the requested content from one of the other computers 204.

In some embodiments, the access manager 302 presents pricing information to a user and in some embodiments the access manager pre-approves the purchase. Pre-approvals include cases where a user has indicated charges made for access to a particular site and/or content will be accepted and cases where a user has indicated such charges will be accepted where identified maximum charges have not been exceeded.

Where a user payment is approved or pre-approved, the access manager 302 forwards transaction data to the payment services manager 304. The transaction data includes indicia of the requested content, indicia of the required payment and indicia of the user. The payment services manager forwards a payment request, indicia indicating a source of payment and a verification return address to the payment processor 306.

Utilizing information received from the payment services manager 304, the payment processor 306 initiates an exchange of consideration provided on the user's behalf for a proof-of-action available from an authorization service provider 310. Providers of this authorization include credit card transaction providers, PayPal®, non-financial authorization service providers, and the like. For example, where the required consideration is that the user view an advertisement, a non-financial authorization provider directs the user computer 202 to the ad site and registers a proof-of-action when the required action has been taken by the user computer.

When the required action has been taken, by or on behalf of the user computer 202, the payment processor 306 delivers a proof-of-action to the payment services manager 304. The payment services manager checks that the action proved by the proof-of-action matches that required by the access manager's 302 initial request for payment. As can be seen here, payments encompass both financial and non-financial consideration offered on behalf of the user in response to respective requests for financial and non-financial payments.

In the case that a payment received by the payment processor 306 is accepted by the payment services manager 304, the payment services manager requests the digital certificate generator 308 to prepare a suitable digital certificate. In various embodiments, the payment services manager 304 or the access manager 302 causes the newly created digital certificate to be delivered to one or more of the user computer 102 and another computer 204. The suitable digital certificate will be used, as described below, to authorize access to the requested content during a particular time period.

A digital certificate including an appropriate certificate authority's signature, a public key, a means for identifying, alone or in combination with other information, the requested content and indicia identifying a time period during which the access to the requested content is to be granted is a suitable digital certificate. Various digital certificates known in the art may be used for this purpose. For example, digital certificates meeting the ITU-T X.509 standard ("509 certificate") for public key infrastructure may be employed as suitable digital certificates where the required information is included in the certificate.

FIG. 4 shows six data fields 400 reserved for particular items of information in a 509 certificate. Data fields are reserved for a serial number 402, an issuer 404, a validity period 406, a common name 408, a public key 410 and a signature 412. In a suitable digital certificate, the information loaded into these fields indicates alone or in combination with other information available to a recipient of the certificate that the certificate was created by a party authorized to grant access to the requested content and that access to the requested content is to be granted to the user computer 202 during a particular time period.

For example, in an embodiment a suitable digital certificate has encrypted data in the signature field 412 showing the certificate was created by a party authorized to grant access to the requested content, data in the common name field 408 identifying, alone or in combination with other information, the requested content, and data in the validity field 406 indicating the period during which access to the requested content is to be granted.

As will be described below, suitable digital certificates may be created by a digital certificate generator 308 running on any of the user computer 202 or one of the other computers 204. They are, however, typically passed to one of the other computers 204 for the purpose of authentication and authorizing access by the user computer 202 to the requested content.

In one of the embodiments where a suitable digital certificate is passed to one of the other computers 204, a user computer 202 (client) initiates a request for particular content 105 and a suitable digital certificate is delivered to another computer 204 (server) during a secure sockets layer (e.g. SSL or TLS protocols) handshake with mutual authentication.

Figure 5:
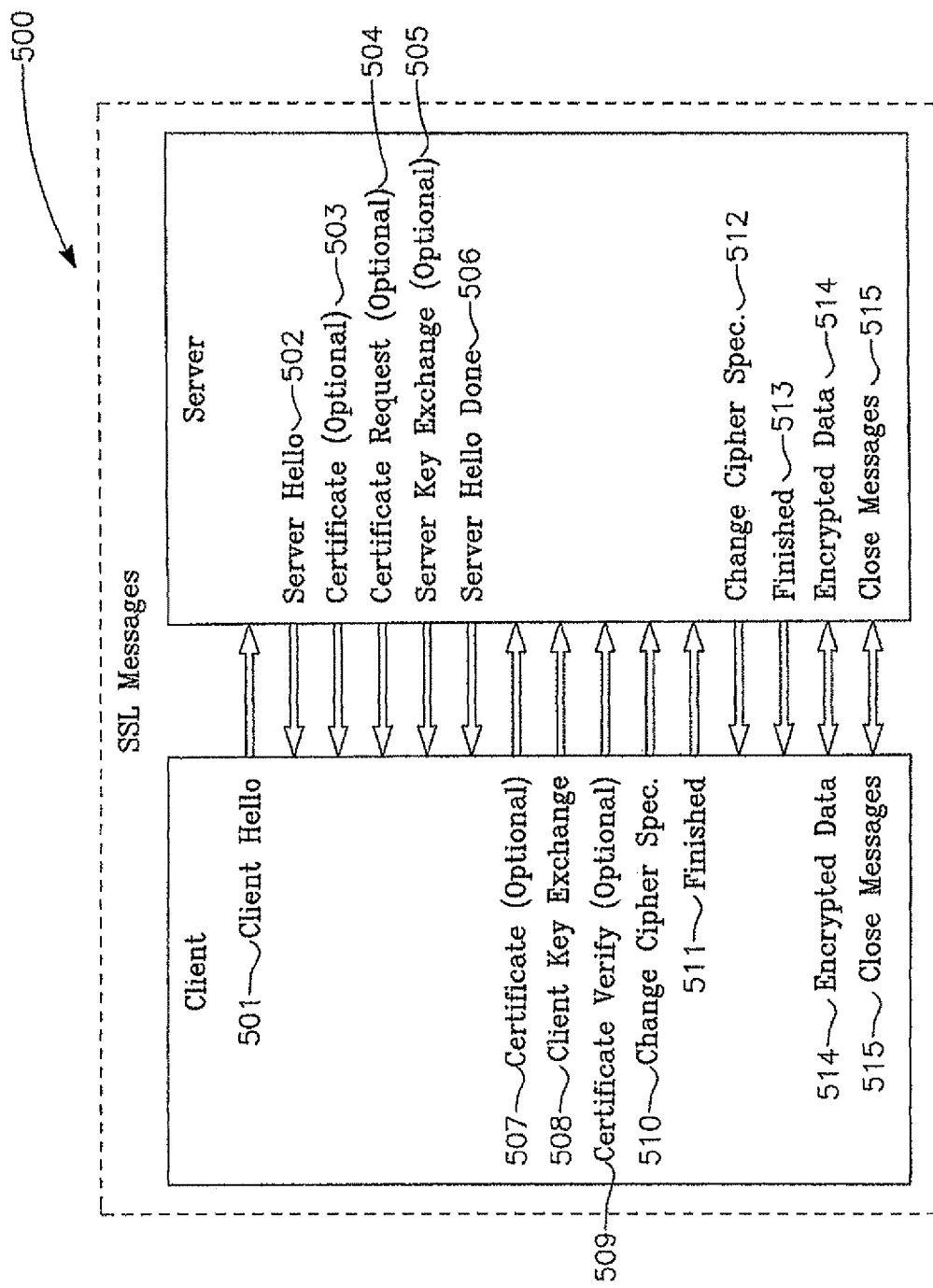
FIG. 5 is a diagram of messages exchanged between two computers during an SSL handshake including messages that may be used in connection with the system and method of FIG. 1.

FIG. 5 shows messages 501-515 exchanged between a client and a server during an SSL handshake 500. Here, the client delivers a digital certificate 507 to the server in response to the server's certificate request 504. Where the client digital certificate 507 is a suitable digital certificate, the server receives by way of the SSL handshake information indicating, alone or in combination with other information available to the server, what content was requested and verification that the certificate was created by a party authorized to grant access to the requested content. Since this process uses SSL protocols commonly available on web servers, no additional server software is required.

The operation of various embodiments of the present invention follows. In these embodiments, a satisfaction means 256 is distributed among a plurality of computers. References therein to browsers should be understood to mean any internet aware application or service.

FIGS. 6a-d show embodiments of the present invention 600a-d that utilize an access manager 302 running on a user computer 202.

Figure 6A:
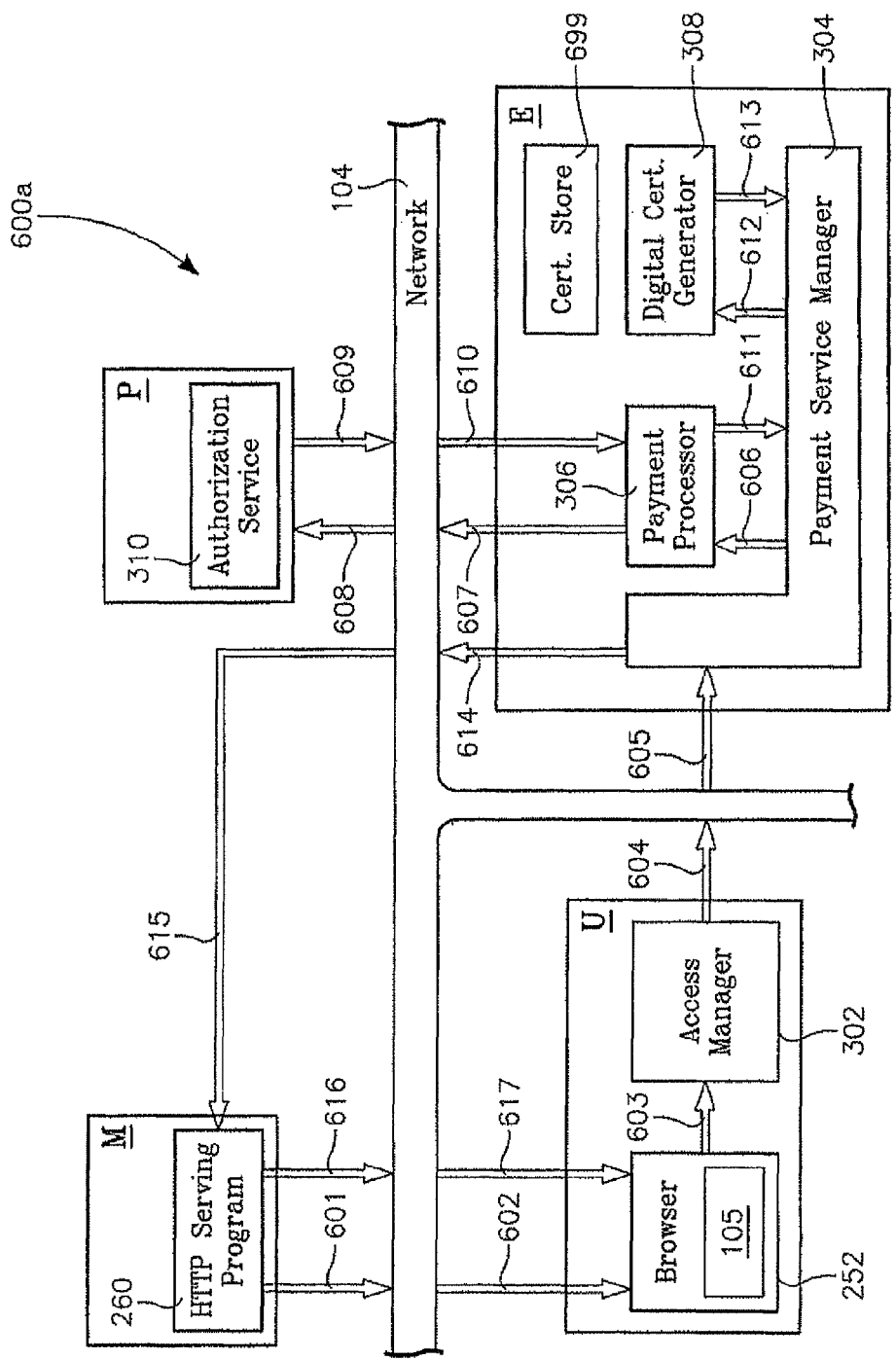
FIG. 6a is a diagram of a fifth embodiment of the system and method of FIG. 1.

In particular, FIG. 6a shows an embodiment 600a where a specification of the requested content is obtained using an unprompted fetch and images of suitable digital certificates are stored on an enabling computer. A network 104 interconnects each of a merchant computer "M" running an HTTP serving program 260, a user computer "U" running an internet aware application such as a browser 252 and an access manager 302, an enabling computer "E" running a payment services manager 304, a payment processor 306 and a digital certificate generator 308, and a payment authorization computer "P" running an authorization service 310.

A link from which a user can initiate a request for particular content 105 is presented by the browser 252 of the user computer U. For example, the link may be included in a web page sent by the HTTP serving program and delivered by the network 601, 602 to the browser. When a request for particular content is initiated 105, the access manager 302 intercepts the browser's request 603 as described above. And, utilizing an unprompted fetch as described above, the access manager sends and the network delivers 604, 605 a request for a suitable digital certificate to the payment services manager 304.

The payment services manager 304 passes a request for payment 606 to the payment processor 306 which forwards it 607,608 to the authorization service 310 via the network. On completion of the requested action, by the user or by another on the user's behalf, the authorization service sends and the network delivers 609, 610 a proof-of-action to the payment processor 306. If the payment processor finds the proof-of-action is satisfactory evidence that the required action occurred, the payment processor indicates to the payment services manager 611 that a suitable digital certificate should be created. The payment services manager requests this certificate 612 from the digital certificate generator 308 which then delivers 613 a suitable digital certificate to the payment services manager.

Now in possession of a suitable digital certificate, the payment services manager stores an image of the certificate in a certificate store 699. The payment services manager also sends and the network delivers 614, 615 a copy of the certificate to the HTTP Serving Program. When the HTTP serving program verifies the signature on the certificate is that of an entity authorized to grant access to the requested content and identifies the requested content, it sends and the network delivers 616, 617 the requested content to the browser 252.

Figure 6B:
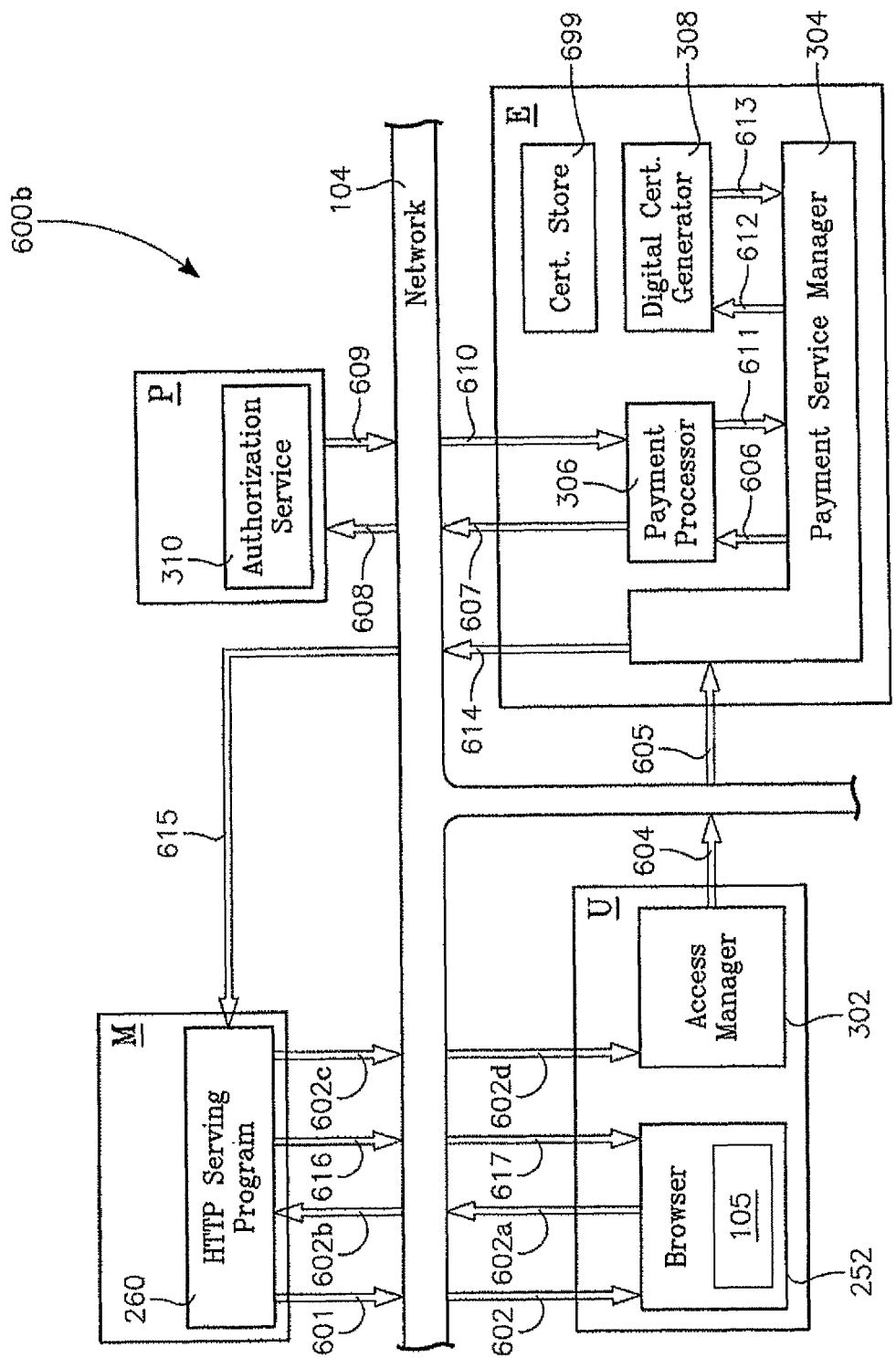
FIG. 6b is a diagram of a sixth embodiment of the system and method of FIG. 1.

FIG. 6b shows an embodiment 600b where a specification of the requested content is obtained from a prompted fetch and a certificate store 699 is located on an enabling computer. A network 104 interconnects each of a merchant computer "M" running an HTTP serving program 260, a user computer "U" running an internet aware application such as a browser 252 and an access manager 302, an enabling computer "E" running a payment services manager 304, a payment processor 306 and a digital certificate generator 308, and a payment authorization computer "P" running an authorization service 310.

A link from which a user can initiate a request for particular content 105 is presented by the browser 252 of the user computer U. For example, the link may be included in a web page sent by the HTTP serving program and delivered by the network 601, 602 to the browser. When a request for particular content is initiated 105, the browser sends and the network delivers 602a, 602b the request to the HTTP serving program 260. In turn, the HTTP serving program sends and the network delivers 602c, 602d a response directed to the browser but intercepted by the access manager 302. Utilizing a prompted fetch similar to one described above, the access manager specifies the requested content. Having a specification for the requested content, the access manager sends and the network delivers 604, 605 a request for a suitable digital certificate to the payment services manager 304. The remainder of this system and method is as was described for FIG. 9a.

Figure 6C:
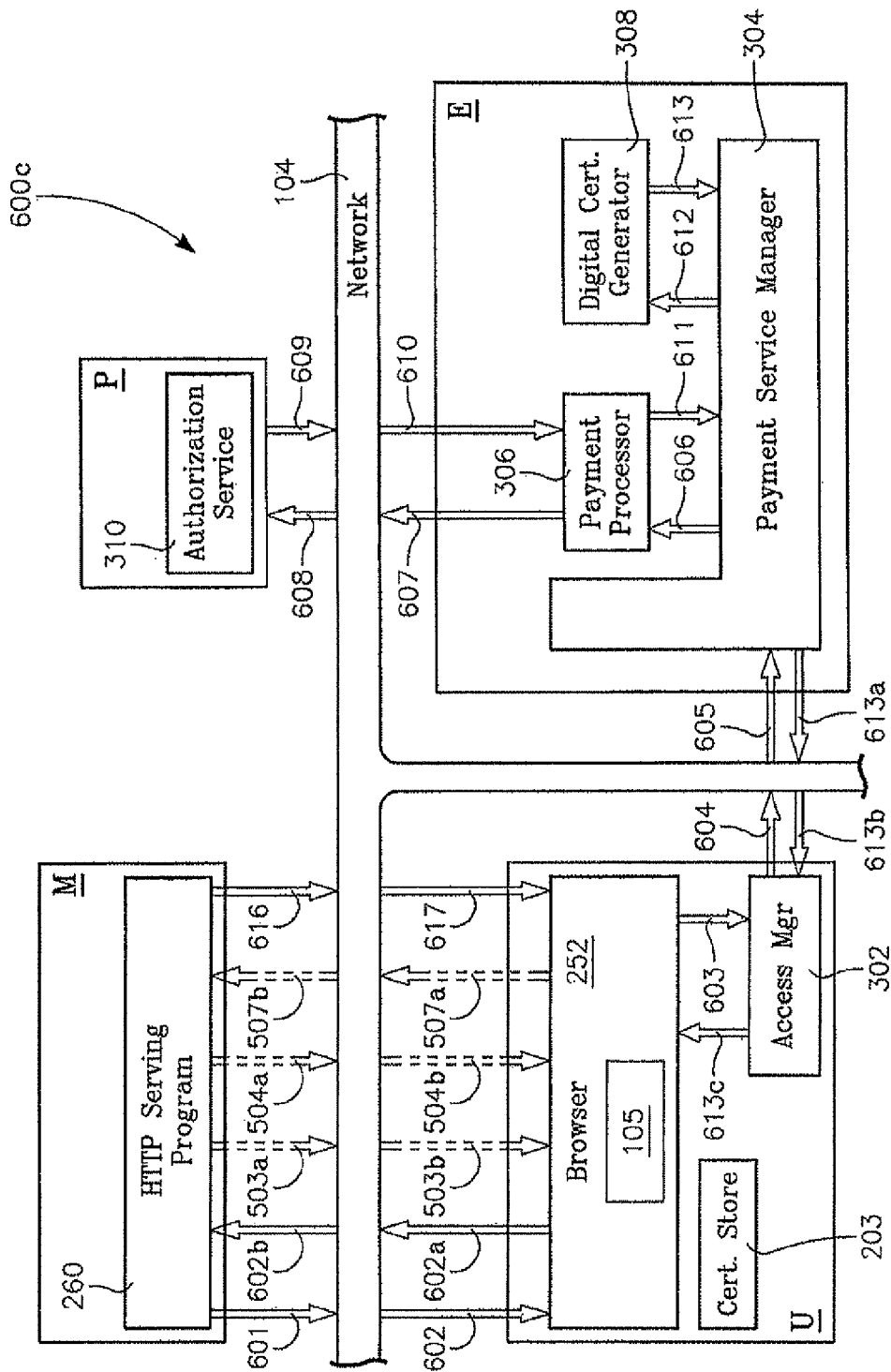
FIG. 6c is a diagram of a seventh embodiment of the system and method of FIG. 1.

FIG. 6c shows an embodiment 600c where a specification of the requested content is obtained using an unprompted fetch and images of suitable digital certificates are stored 203 on a user computer 202. A network 104 interconnects each of a merchant computer "M" running an HTTP serving program 260, a user computer "U" running an internet aware application such as a browser 252 and an access manager 302, an enabling computer "E" running a payment services manager 304, a payment processor 306 and a digital certificate generator 308, and a payment authorization computer "P" running an authorization service 310.

A link from which a user can initiate a request for particular content 105 is presented by the browser 252 of the user computer U. For example, the link may be included in a web page sent by the HTTP serving program and delivered by the network 601, 602 to the browser. When a request for particular content is initiated 105, the browser sends the request to the HTTP serving Program but, it is intercepted by the access manager 603. Utilizing an unprompted fetch as described above, the access manager obtains a specification for the requested content. The access manager then sends and the network delivers 604, 605 a request for a suitable digital certificate to the payment services manager 304. As described above, a suitable digital certificate is returned to the payment services manager.

Now in possession of a suitable digital certificate, the payment services manager 304 sends and the network delivers 613a, 613b the certificate to the access manager 302. The access manager stores an image of the certificate in a certificate store of the user computer 203 and sends a copy of the certificate to the browser 613C. In turn, the browser sends and the network delivers 613d, 613e the certificate to the HTTP Serving Program. When the HTTP serving program verifies the signature on the certificate is that of an entity authorized to grant access to the requested content and identifies the requested content, it sends and the network delivers 616, 617 the requested content to the browser 252. A variation of the system and method of FIG. 6c may also be implemented using a prompted fetch, as has been described above, to specify the requested content.

In an alternative embodiment of FIG. 6c, an SSL handshake with mutual authentication is used. Here, optional messages 602a,b, 503a,b, 504a,b and 507a,b are exchanged. These messages support the exchange of a suitable digital certificate by means of an SSL handshake similar to the one discussed in connection with FIG. 5 above. In particular, in response to the browser's request for content 602a,b, the HTTP serving program sends and the network delivers 503a,b a digital certificate of the merchant computer to the browser 252. Subsequently, the HTTP serving program sends and the network delivers 504a,b a request for the user computer's digital certificate. As described above, the access manager 302 manages the acquisition of a suitable digital certificate and returns it to the browser 252. The HTTP serving program therefore receives a suitable digital certificate when the browser sends and the network delivers 507a,b the certificate in response to the HTTP serving program's SSL handshake certificate request. When the HTTP serving program verifies the signature on the certificate is that of an entity authorized to grant access to the requested content and identifies the requested content, it sends and the network delivers 616, 617 the requested content to the browser 252.

Figure 6D:
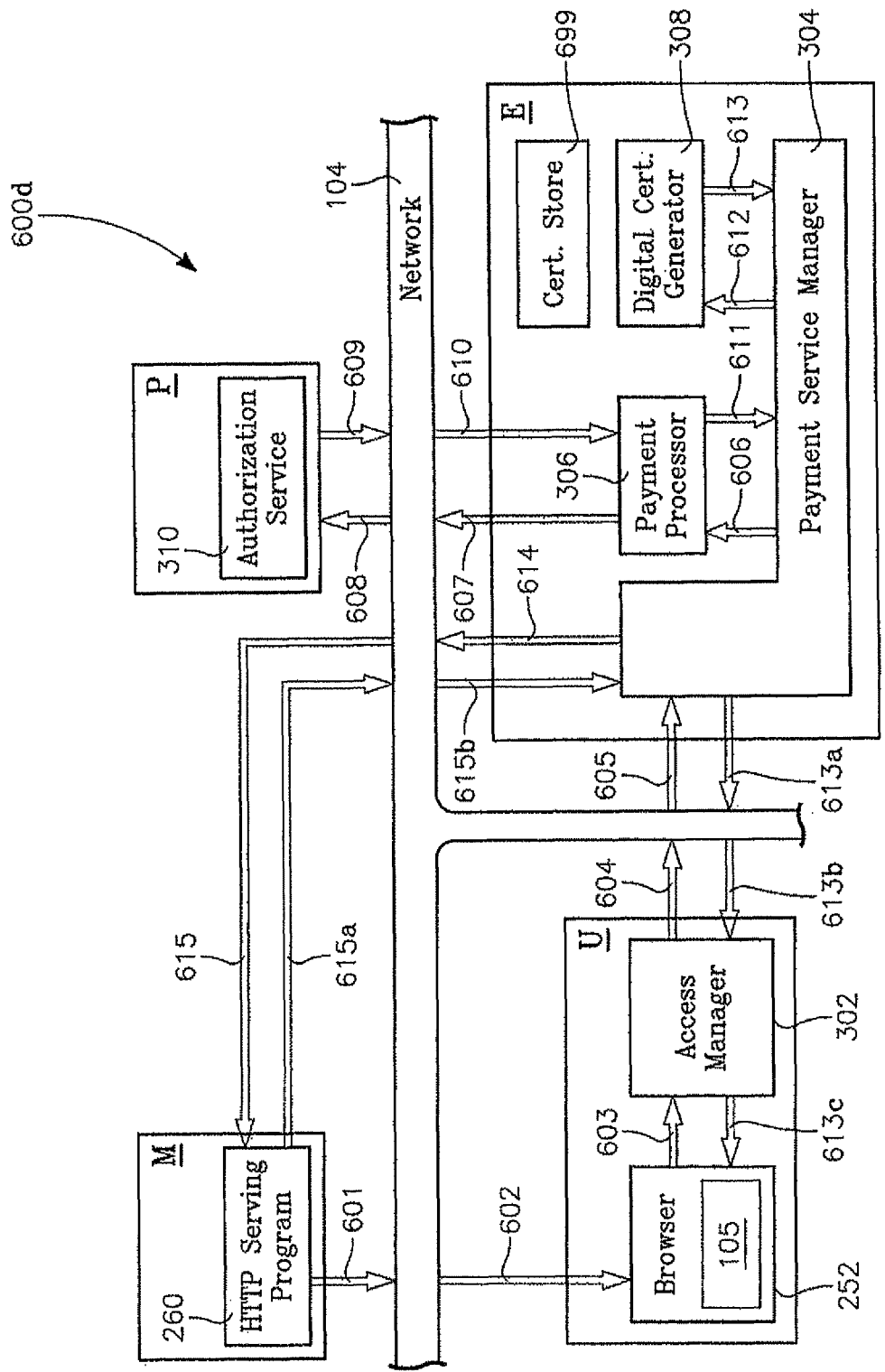
FIG. 6d is a diagram of an eighth embodiment of the system and method of FIG. 1.

FIG. 6d shows an embodiment 600d where the requested content is delivered from a payment services manager 304. This embodiment is especially suited to the inclusion of user computers such as cell phones, personal digital assistants and similar devices having only limited data handling capabilities. A network 104 interconnects each of a merchant computer "M" running an HTTP serving program 260, a user computer "U" running an internet aware application such as a browser 252 and an access manager 302, an enabling computer "E" running a payment services manager 304, a payment processor 306 and a digital certificate generator 308, and a payment authorization computer "P" running an authorization service 310.

A link from which a user can initiate a request for particular content 105 is presented by the browser 252 of the user computer U. For example, the link may be included in a web page sent by the HTTP serving program and delivered by the network 601, 602 to the browser. When a request for particular content is initiated 105, the browser sends the request to the HTTP serving Program but, it is intercepted by the access manager 603. Utilizing an unprompted fetch as described above, the access manager obtains a specification for the requested content. The access manager then sends and the network delivers 604, 605 a request for a suitable digital certificate to the payment services manager 304. As described above, a suitable digital certificate is returned to the payment services manager.

Now in possession of a suitable digital certificate, the payment services manager 304 stores an image of the certificate in a certificate store 699. The payment services manager also sends and the network delivers 614, 615 a copy of the certificate to the HTTP Serving Program 260. When the HTTP serving program verifies the signature on the certificate is that of an entity authorized to grant access to the requested content and identifies the requested content, it sends and the network delivers 615a, 615b the requested content to the payment services manager. The browser 252 receives the requested content from the access manager 613c after the payment services manager sends and the network delivers 613a, 613b the requested content to the access manager 302. A variation of the system and method of FIG. 6d may also be implemented using a prompted fetch, as has been described above, to specify the requested content.

Figure 6E:
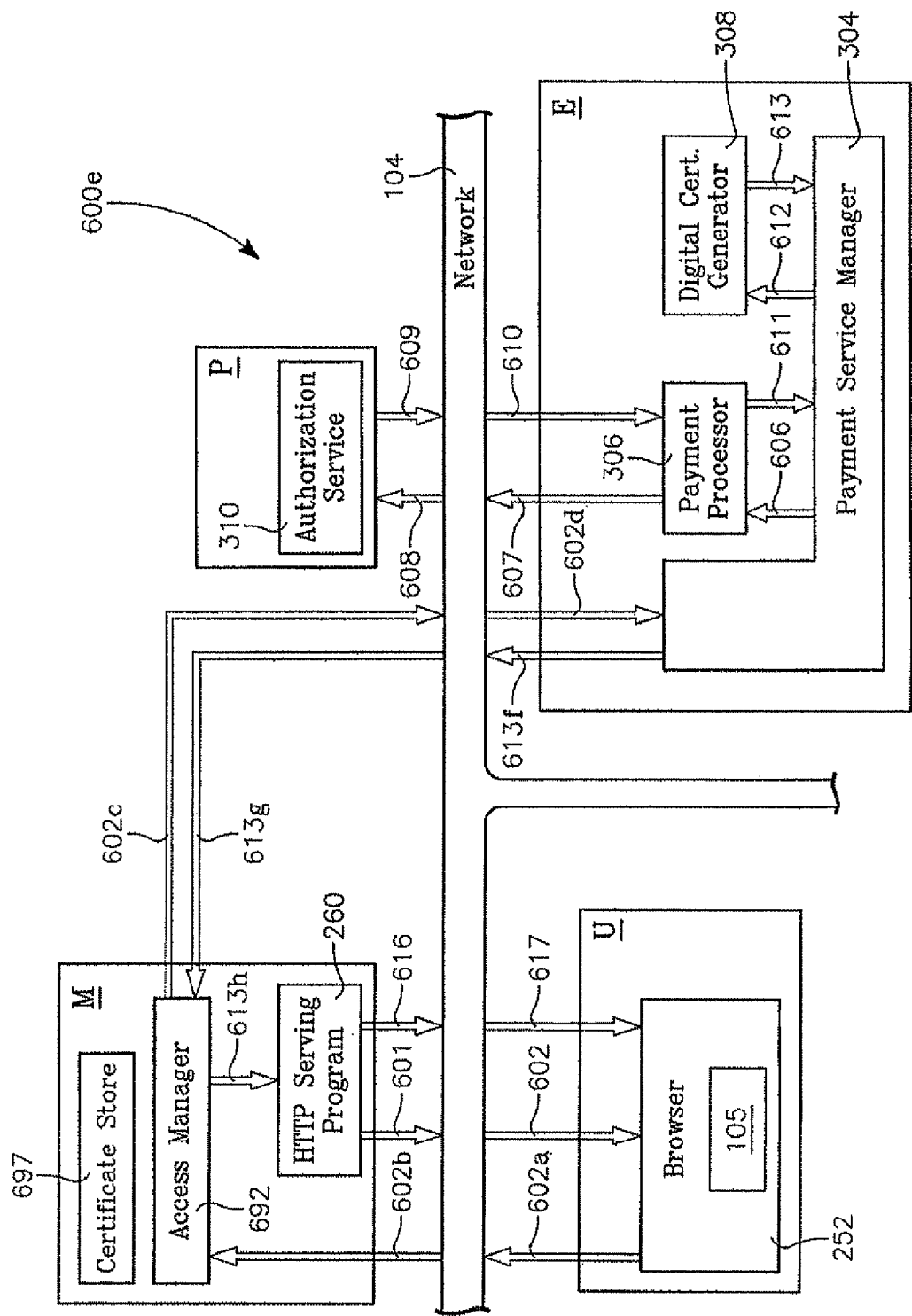
FIG. 6e is a diagram of a ninth embodiment of the system and method of FIG. 1.

FIG. 6e shows an embodiment 600e having an access manager 692 running on a merchant computer M. A network 104 interconnects each of a merchant computer "M" running an HTTP serving program 260 and an access manager 692, a user computer "U" running an internet aware application such as a browser 252, an enabling computer "E" running a payment services manager 304, a payment processor 306 and a digital certificate generator 308, and a payment authorization computer "P" running an authorization service 310.

A link from which a user can initiate a request for particular content 105 is presented by the browser 252 of the user computer U. For example, the link may be included in a web page sent by the HTTP serving program and delivered by the network 601, 602 to the browser. When a request for particular content is initiated 105, the browser sends 602a the request to the HTTP serving program but, when delivered by the network the request is intercepted by the access manager 602b. Using indicia included in the request, alone or in combination with other available information, the access manager 692 obtains a specification for the requested content. The access manager then sends and the network delivers 602c, 602d a request for a suitable digital certificate to the payment services manager 304. As described above, a suitable digital certificate is returned to the payment services manager.

Now in possession of a suitable digital certificate, the payment services manager sends and the network delivers 613f, 613g the certificate to the access manager 692. The access manager stores an image of the certificate in a certificate store of the merchant computer 697 and sends the certificate to the HTTP serving program 613h. When the HTTP serving program verifies the signature on the certificate is that of an entity authorized to grant access to the requested content and identifies the requested content, it sends and the network delivers 616, 617 the requested content to the browser 252.

Figure 6F:
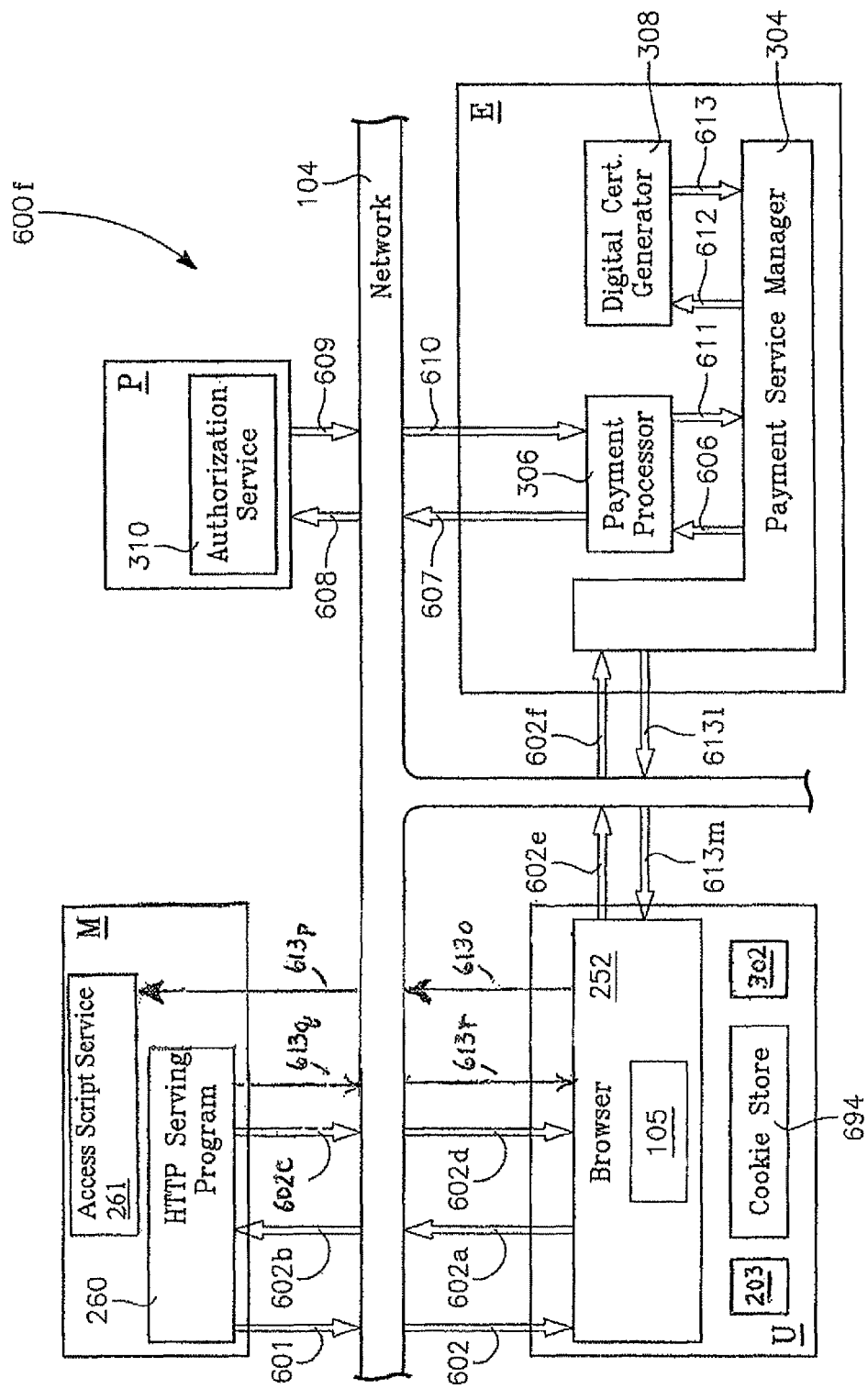
FIG. 6f is a diagram of a tenth embodiment of the system and method of FIG. 1.

FIG. 6f shows an embodiment 600f of the present invention utilizing HTTP cookies. Here, a suitable HTTP cookie is used. A suitable cookie is one which includes a suitable digital certificate embedded therein. In particular, a network 104 interconnects each of a merchant computer "M" running an HTTP serving program 260 and an access script service 261, a user computer "U" running an internet aware application such as a browser 252, an enabling computer "E" running a payment services manager 304, a payment processor 306 and a digital certificate generator 308, and a payment authorization computer "P" running an authorization service 310.

A link from which a user can initiate a request for particular content 105 is presented by the browser 252 of the user computer U. For example, the link may be included in a web page sent by the HTTP serving program and delivered by the network 601, 602 to the browser.

Where the HTTP serving program requests a suitable HTTP cookie in response to an earlier request for particular digital content 602a,b, a suitable HTTP cookie may be available to the browser 252, such as a suitable cookie stored in an HTTP cookie list/store of the user computer 694. Here, the access manager 302 will discover the suitable HTTP cookie and make it available, directly or via the browser, to the HTTP serving program. For example, the browser sends and the network will delivers 613o, 613p the suitable HTTP cookie to the HTTP serving program which will in turn send for delivery by the network 613q, 613r the requested content.

Where no suitable HTTP cookie is available for the benefit of the user computer U, then an access script service 261 contemporaneously creates a suitable HTTP cookie. Here, the browser 252 (as shown) or an access manager 302 sends and the network delivers 602e, 602f a request for a suitable digital certificate to the payment services manager 304. As described above, a suitable digital certificate is returned to the payment services manager. The payment services manager sends and the network delivers 613*l,m* the suitable digital certificate to the browser (as shown) or to the access manager. The browser (as shown) or the access manager sends and the network delivers 613*o,p* the suitable digital certificate to the access script service 261. A suitable HTTP cookie created by the access script service is sent to the HTTP serving program 260. The HTTP serving program sends and the network delivers 613*q,r* the suitable HTTP cookie and the requested content to the browser and the browser stores a copy of the suitable cookie in the cookie store 694.

In some embodiments using a suitable HTTP cookie, the access manager 302 derives a suitable digital certificate from a suitable HTTP cookie. The suitable digital certificate is then stored by the access manager in a digital certificate store 203 of the user computer U.

And in some embodiments, an access manager 302, 692 may located on a network boundary, edge or interconnecting device. For example, one or more user computers U may utilize an access manager running on a router or firewall device interconnecting a local area network and a wide area network.

Various other embodiments are described below.

In client-based systems for performing network transactions certain methods and systems described herein provide a client system that facilitates electronic transactions, such as transactions over a network (e.g., the Internet). In certain embodiments, the disclosed inventions facilitate user purchases of digital content by providing a straightforward process for authorizing the purchase of digital content and/or for protecting the identity of the user.

In certain embodiments, a client system is disclosed that comprises a secure proxy module and an access module, The proxy module monitors requests, such as HTTP requests, by the client system. If a client system request is recognized as being sent to a particular content server (e.g., recognizing a URL associated with an HTTP request as being a particular URL), the proxy module determines if a valid digital certificate is available on the client system for the particular request. If a valid digital certificate is not available, the access module purchases the digital certificate from a certification module. Upon receiving the digital certificate, the proxy module converts the request to a secure request (e.g., HTTPS request) to the content server and establishes a connection with the content server to receive digital content from the content server.

In certain embodiments, the client system further comprises a local database that identifies requests to particular content servers that use digital certificates to perform one or more network transactions. The local database may further include a list of a plurality of certificates that are associated with particular requests and/or content servers. In certain embodiments, the local database is in communication with a remote database to receive updated information relating to the digital certificates.

In other embodiments the proxy module and/or the database is located remote to the client system. For instance, the client system may communicate with a remote server to determine what type of certificates are usable with a particular request to a content server, In yet other embodiments, the content provider may send a list of approved digital certificates to the client system.

In yet other embodiments of the invention, the client system comprises an HTTPS handler. In such embodiments, the client system may establish a connection with a content server prior to determining the availability of one or more digital certificates. In such embodiments, a hook associated with the handler may be configured to verify whether a particular website accessed by the client is on list of selected websites that accept digital certificates as proof of payment for digital content transactions.

Furthermore, the systems and methods described herein can advantageously be implemented using computer software, hardware, firmware, or any combination of software, hardware, and firmware. In certain embodiments, the system is implemented as a number of software modules that comprise computer executable code for performing the functions described herein. In certain embodiments, the computer-executable code is executed on one or more general purpose computers. However, any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

In server-oriented systems and methods for performing network transactions certain methods and systems described herein provide server systems for facilitating electronic transactions, such as transactions over a network (e.g., the Internet), between a client computing device and a content server. In certain embodiments, the systems and methods allow for access to digital content based on a parameter (e.g., a data string) and/or an encrypted cookie associated with a client request for the digital content. Such embodiments may be advantageously implemented with client computing devices having a reduced processing power (e.g., a mobile phone).

In certain embodiments, a method is disclosed for performing a network transaction between a content server and a client computing device. The content server receives a request from the client computing device (such as from a browser of the client computing device) for certain digital content. The content server determines if the client request includes an appropriate parameter and/or a cookie for granting the client computing device access to the digital content. If the client request does not have the appropriate parameter and/or cookie, the content server directs the client computing device to a certification module, wherein a user of the client computing device is provided with an option to purchase and/or acquire the appropriate parameter and/or cookie to access the desired content.

In certain embodiments, a system is disclosed for performing a network transaction, the system comprising a client module, a content provider, and a certification module. In certain embodiments, the client module communicates with the content provider to request and obtain digital content over a network. The certification module provides the client module with one or more digital certificates that are used as proof of purchase when acquiring the digital content from the content provider.

The client computing devices disclosed herein may comprise, but are not limited to, handheld computing devices, cell phones, mobile phones, personal digital assistants, laptop computers, media devices, smart TVs, Internet phones, gaming boxes, MP3 players, combinations of the same, and the like.

In certain embodiments, a method is disclosed for purchasing digital content (e.g., a ring tone, wall paper, background and/or audiovisual content) for use on a mobile device, such as a cellular phone. The user accesses a content service provider through a client computing device, such as a computer. Upon selecting the desired content, the user receives instructions to use his or her mobile device to provide an alphanumeric code to a designated address through a messaging service (e.g., short messaging service (SMS)). A return message then provides the user with an option to confirm the purchase of the selected content. Upon confirmation, a user account (e.g. a PayPal, credit card, debit card, phone, checking, and/or savings account) is charged using user information stored and/or inputted into the mobile device, and the content is downloaded to the mobile device.

In electronic systems and methods for regulating access to content servers certain methods and systems described herein provide a management service that facilitates electronic transactions, such as transactions over a network (e.g., the Internet), between a client computing device and a content server. For example, in certain embodiments one or more digital certificates purchased by a user are used in an electronic transaction to confirm proof of payment for access to digital content on content servers.

In certain embodiments, the one or more digital certificates are used to provide for and/or monitor access to a website of a content provider (e.g., a news site, a greeting card site, or other like site requiring a subscription and/or access fee). For instance, a digital certificate may provide a client access to the content of the website for a particular duration of time (e.g., 24 hours). In certain embodiments, the digital certificates) allow a user to return to the website repeatedly during the particular duration of time without having to provide additional information (e.g., financial and/or identifying information) to re-access the website content.

In certain embodiments of the invention, a method is disclosed for allowing a user to prepay for access to a content server for a selected period of time. For example, a user may be provided with an option of purchasing at least one of a plurality of digital certificates for use in accessing content of the content server, wherein the plurality of digital certificates are associated with an access duration and/or a limited scope of the content to be accessed. For instance, certain digital certificates may allow for access to a larger amount of content than other digital certificates.

In other embodiments, content accessing systems are disclosed wherein a client computing device includes a time module that communicates with purchased digital certificates. The time module advantageously indicates to a user, such as through an interface, an amount of time remaining for accessing content of a particular website based on the purchased digital certificate(s).

In electronic systems and methods for dynamic allocation of charging for content access certain methods and systems described herein provide a payment and content management service for electronic transactions, such as transactions over a network (e.g., the Internet).

For example, in certain embodiments, a method is disclosed for charging an account of a user who accesses content over a network, such as the Internet. The method includes monitoring a number of users that access particular content, such as a website and/or a blog. When the number of users exceeds a predetermined amount, a subsequent user that requests access to the content is required to provide payment to access the content. In certain embodiments, such payment is verified through the use of one or more digital certificates associated with the client computing device of the subsequent user.

In yet other embodiments, the method includes monitoring a number of "hits" to the website or blog, wherein multiple hits may correspond to a plurality of accesses by the same user.

In enhanced digital certificates usable in network transactions certain methods and systems described herein provide a payment and content management service that facilitates electronic transactions, such as transactions over a network (e.g., the Internet). For example, in certain embodiments, one or more digital certificates are used in an electronic transaction to confirm proof of payment for access to digital content of particular content servers.

In certain embodiments, a system is disclosed comprising a client computing device that communicates with a content server to obtain digital content. The client computing device includes a client module, which forms a communication channel with the content server and utilizes one or more digital certificates as proof of payment for the digital content. The client module may also be configured to embed in the digital certificate(s) data representing one or more transaction parameters.

For instance, the client module may embed a data string or the like in the digital certificate. The content server may then use the data to extract information relating to the specific transaction. For example, the data string may contain information relating to a path to a directory storing the digital content, an identification of the scope of access (e.g., type of pass) granted by the digital certificate, combinations of the same or the like.

In yet other embodiments, the transaction parameter may be embedded by a remote computing device from which the client computing device obtains the digital certificate. For instance, a certification module that generates the digital certificate may embed the parameter data in the digital certificate.

In certain embodiments, a method is disclosed for facilitating a network transaction. The method includes obtaining a digital certificate indicative of a proof of payment for access to particular digital content. The method further includes embedding in the digital certificate data representing one or mere transaction parameters, wherein the transaction parameter(s) relate to the scope of access and/or location of requested content associated with the digital certificate. The content server may then extract the data during the network transaction.

In systems and methods for protecting financial data in network transactions certain methods and systems described herein provide a payment and content management service that facilitates electronic transactions, such as transactions over a network (e.g., the Internet). For example, in certain embodiments, one or more digital certificates are used in an electronic transaction to confirm proof of payment for accessing digital content of certain providers. The use of digital certificates further advantageously provides for user anonymity and/or protection of the user's financial data.

In certain embodiments, a system is disclosed for performing an electronic transaction. The system includes a client module that requests digital content over a network from a content provider. The client module is further configured to provide the content provider with one or more digital certificates as proof of payment for accessing the digital content. In certain embodiments, the client module does not provide the content provider with information revealing the identity of the user and/or specific financial information of the user (e.g., credit card number, account number, or the like) in order to access the digital content.

In certain embodiments, a method is disclosed for performing an electronic transaction. The method includes sending a user request for digital content to a content provider over a network. The method further includes obtaining one or more digital certificates that are indicative of proof of payment for accessing the digital content. In certain embodiments, the digital certificate(s) are then sent to the content provider without further information revealing the identity of a user and/or financial information specific to the user.

In certain embodiments, a digital certificate is disclosed that is capable of representing proof of payment in an electronic transaction without revealing an identity of a consumer and/or financial information specific to the consumer.

In systems and methods for performing network transactions certain methods and systems described herein provide a payment and content management service that facilitates electronic transactions, such as transactions over a network (e.g., the Internet). In certain embodiments, the disclosed inventions offer online content providers a less expensive, secure, and/or adaptable alternative in providing digital content.

In certain embodiments, a system is disclosed for performing a network transaction, the system comprising a client module, a content provider, a certification module, and an account module. In certain embodiments, the client module communicates with the content provider to request and obtain digital content over a network. The certification module provides the client module with one or more purchased digital certificates that allow the client module to obtain the digital content. For instance, the digital certificate may represent a particular payment previously made, or funds transferred, from a user account to the account module (such as, for example, a PayPal account).

In certain embodiments, a method of performing a network transaction with a client module comprises: (1) requesting digital content from a content provider; (2) requesting payment information from the certification module; (3) providing a payment to the account module; (4) receiving a digital certificate from the certification module; (5) delivering the digital certificate to the content provider; and (6) receiving the digital content from the content provider.

In yet other embodiments, the client module may purchase one or more digital certificates directly from the content provider. In yet other embodiments, the certification module may communicate directly with the content provider to obtain the requested digital content and to forward the digital content to the client module. In such embodiments, the certification module may aggregate multiple user requests for digital content in a single subscription purchased from the content provider.

In certain embodiments, the aforementioned client module resides on a user computer and comprises a secure proxy and access client that communicates with an application (such as, for example, a browser) on the user computer. The access client may communicate with the certification module to obtain the digital certificate(s) for purchasing the digital content. The secure proxy may establish communication with the content provider through a secure socket layer (SSL) protocol to obtain the requested digital content through use of the appropriate digital certificate(s). In certain embodiments, the content provider may also communicate a list of approved digital certificates to the secure proxy. In certain embodiments, the certification module further communicates with the content provider to establish price configurations for particular digital content and/or to report content and/or digital certificate purchases.

In certain embodiments, a method is disclosed for performing electronic transactions using a public key infrastructure (PKI) based payment and access control service. For example, in certain embodiments one or more digital certificates are used in an electronic transaction to verify proof of payment rather than, or in addition, proof of identity of a user.

For instance, disclosed methods may include generating a x.509 compliant and/or time-stamped digital certificate that allows a user to access particular online content. In certain further embodiments, the purchased digital certificates expire after a predetermined duration of time (e.g., 24 hours).

In network transactions and access using multiple digital certificates certain methods and systems described herein provide a payment and content management service that facilitates electronic transactions, such as transactions over a network (e.g., the Internet). For example, in certain embodiments one or more digital certificates are used in an electronic transaction to confirm proof of payment for access to digital content provided by content servers.

In certain embodiments, a system is disclosed for performing a network transaction. The system includes a client computing device that communicates with a content provider to obtain digital content. The client computing device comprises a client module that provides a plurality of digital certificates as proof of payment to the content provider during a single network transaction.

In certain embodiments, each digital certificate represents a monetary value paid by a user for access to the digital content, wherein monetary values may differ between certificates. For instance, a first digital certificate may be associated with a value of one dollar ($1), and a second digital certificate may be associated with a value of twenty-five cents ($0.25). Thus, the two digital certificates combined represent a value of $1.25 for accessing the digital data.

In certain embodiments, each digital certificate represents a scope of access or a pass identification. For instance, a first digital certificate may be associated with a "group" pass, which allows access to a first scope of digital content, and a second digital certificate may be associated with a "corporate" pass, which allows access to a second scope of digital content.

In certain embodiments, a method is disclosed for performing a transaction over a network. The method comprises obtaining a plurality of digital certificates for use in a network transaction as proof of payment for particular digital content. The digital certificates may each represent a scope of access, a pass identification a monetary value, an access duration, combinations of the same or the like. The method further includes providing at least two of the plurality of digital certificates to a content server in order to access the particular content on the content server.

In systems and methods for accessing content search results certain methods and systems described herein provide a payment and content management service that facilitates electronic transactions, such as transactions over a network (e.g., the Internet). For example, in certain embodiments one or more digital certificates are used in an electronic transaction to confirm proof of payment during access to particular content associated with a search result.

In certain embodiments, a method is disclosed for facilitating access to search results that require user information or access fees. The method comprises reviewing a plurality of search results to identify which of the search results require user information and/or an access fee for obtaining content associated with the particular search result. For each of the identified search results, the method includes providing an indication to a user that the identified search result requires additional user information and/or an access fee to obtain the associated content.

For instance, in certain further embodiments, the method may display a link or other visual information, near each identified search result, that allows a user to purchase one or more digital certificates usable to access the content of the particular search result.

In certain embodiments, a system is disclosed for facilitating access to search results requiring user login information and/or access fees. The system includes a client module that accesses a list of search results to identify which search results require user login information and/or an access fee to obtain associated digital content. The client module further provides the user with an indication of the identified search results. For instance, the client module may provide the user with an active hypertext link that allows the user to purchase and/or download digital certificates for accessing digital content of the associated search result. In situations wherein the client module already has the appropriate digital certificates, the user may directly access the content without providing additional user login information and/or financial information.

In electronic systems and methods for performing trusted purchases certain methods and systems described herein, provide a payment and content management service that facilitates electronic transactions, such as transactions over a network (e.g., the Internet). For example, in certain embodiments one or more digital certificates are used in an electronic transaction to confirm proof of payment during access to digital content of content providers.

In certain embodiments, an authorization module on a client computer allows a user to select one or more content providers for which electronic payments are pre-approved. For instance, the authorization module may store a list of user-selected websites that the user has pre-approved for access charges. In certain embodiments, access to the website(s) may be based on the use of one or more digital certificates that represent proof of payment for such access.

In certain embodiments, an electronic transaction method is disclosed for paying for digital content. The method comprises providing a user interface through which a user selects one or more content providers (e.g., websites) that are pre-approved for payments for access to the content. The user interface may include one or more lists of available content providers, and/or the user interface may receive user input as to pre-approved content providers. In certain further embodiments, the method includes receiving a maximum payment input from the user that identifies a pre-approved payment limit for a particular content provider or group of content providers. The method further comprises storing a list of the pre-approved content providers.

In certain embodiments, a client module on a user computing device accesses the list of pre-approved content providers in response to a HTTP request sent to a selected content provider over a network. If the selected content provider is on the list of pre-approved content providers, the client module automatically establishes a connection with the selected content provider to obtain the requested content. In such embodiments, the connection between the user computing device and the selected content provider may be advantageously formed with no or little additional user input (e.g., financial information, user login and/or password).

In certain embodiments, the aforementioned method provides for a straightforward payment and content access process. For instance, a user may access digital content, which generally requires an access fee, without inputting additional financial and/or identity information. In yet other embodiments, the list of pre-approved content providers may correspond to one or more trusted lists stored by a browser (e.g., Internet Explorer) of the client computer.

Furthermore, in certain embodiments, the systems and methods described herein can advantageously be implemented using computer software, hardware, firmware, or any combination of software, hardware, and firmware. In certain embodiments, the system is implemented as a number of software modules that comprise computer executable code for performing the functions described herein. In certain embodiments, the computer-executable code is executed on one or more general purpose computers. However, any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A system for selectively granting access to digital content utilizing a digital certificate embodied on a non-transitory computer readable medium comprising:
   a computer network operable to enable data communications between a plurality of computers including first, second and third computers;
   the digital certificate created by the first computer after the second computer initiates a request for particular digital content available from another computer of the plurality of computers, the digital certificate being created during a secure sockets layer handshake;
   data indicative of the requested content contained in a data field of the digital certificate;
   the third computer operable to cause the requested content to be made available to the second computer after it verifies a signature on the digital certificate is that of an entity authorized to grant access to the requested content; and
   an internet protocol stack located on the second computer; and, access manager code located in the internet protocol stack; and
   wherein the access manager is implemented, at least in part, as a proxy service.

2. The system of claim 1, wherein the digital certificate data field is a field reserved for a common name.

3. The system of claim 1, wherein the data indicative of the requested content includes a unique identifier for a billable product, said product including the requested content.

4. The system of claim 1, further comprising a public key infrastructure wherein the third computer requests and receives the digital certificate from another computer of the plurality of computers during a secure sockets layer handshake requiring mutual authentication.

5. The system of claim 4, wherein the digital certificate data field is a field reserved for a common name.

6. The system of claim 4, wherein the data indicative of the requested content includes a unique identifier for a billable product, said product including the requested content.

7. The system of claim 4, further comprising:
an internet protocol stack located on the second computer; and,
access manager code located in the internet protocol stack.

8. The system of claim 4, wherein the access manager is implemented, at least in part, as a proxy service.

9. The system of claim 1 further comprising:
a digital certificate generator running on the first computer;
a certificate store accessible by the first computer;
a internet aware application and an access manager running on the second computer;
an HTTP serving program running on the third computer;
wherein the access manager requests a suitable digital certificate from the first computer;
wherein the first computer utilizes the digital certificate generator to create a suitable digital certificate after receiving proof from an authorization service that a required action was taken, wherein the first computer stores an image of the suitable digital certificate in the certificate store and sends a copy to the HTTP serving program; and,
wherein after receiving the suitable digital certificate, the HTTP serving program causes the requested content to be sent to the first computer which makes the requested content available to the internet aware application.

10. The system of claim 9, further comprising a public key infrastructure wherein the third computer requests and receives the digital certificate from the second computer during a secure sockets layer handshake requiring mutual authentication.

11. The system of claim 1, further comprising:
a digital certificate generator running on the first computer;
a certificate store accessible by the first computer;
an internet aware application and an access manager running on the second computer;
an HTTP serving program running on the third computer;
wherein the access manager requests a suitable digital certificate from the first computer;
wherein the first computer utilizes the digital certificate generator to create a suitable digital certificate after receiving proof from an authorization service that a required action was taken;
wherein the first computer stores an image of the suitable digital certificate in the certificate store and sends. a copy to the HTTP serving program; and,
wherein the HTTP serving program makes the requested content available to the internet aware application after it receives the suitable digital certificate.

12. The system of claim 11 wherein the second computer utilizes an unprompted fetch to obtain a specification of a suitable digital certificate.

13. The system of claim 11 wherein the second computer utilizes a prompted fetch to obtain a specification of a suitable digital certificate.

14. The system of claim 1 further comprising:
a digital certificate generator running on the first computer;
a internet aware application and an access manager running on the second computer;
a certificate store accessible by the second computer;
an HTTP serving program running on the third computer;
wherein the access manager requests a suitable digital certificate from the first computer;
wherein the first computer utilizes the digital certificate generator to create a suitable digital certificate after receiving proof from an authorization service that a required action was taken;
wherein the first computer sends the suitable digital certificate to the access manager which stores a copy in the certificate store and causes a copy to be sent to the HTTP serving program; and,
wherein the HTTP serving program makes the requested content available to the internet aware application after it receives the suitable digital certificate.

15. The system of claim 14 wherein the second computer utilizes an unprompted fetch to obtain a specification of a suitable digital certificate.

16. The system of claim 14 wherein the second computer utilizes a prompted fetch to obtain a specification of a suitable digital certificate.

17. The system of claim 14, further comprising a public key infrastructure wherein the third computer requests and receives the digital certificate from the second computer during a secure sockets layer handshake requiring mutual authentication.

18. The system of claim 1, further comprising:
a digital certificate generator running on the first computer;
a internet aware application running on the second computer;
an HTTP serving program and an access manager running on the third computer;
a certificate store accessible by the third computer;
wherein the access manager requests a suitable digital certificate from the first computer;
wherein the first computer utilizes the digital certificate generator to create a suitable digital certificate after receiving proof from an authorization service that a required action was taken; and,
wherein the first computer sends the digital certificate to the third computer which stores an image of the suitable digital certificate in the certificate store and makes the requested content available to the internet aware application.

19. The system of claim 18, further comprising a public key infrastructure wherein the third computer requests and receives the digital certificate from the first computer during a secure sockets layer handshake requiring mutual authentication.

20. A system for selectively granting access to digital content utilizing a digital certificate embodied on a non-transitory computer readable medium comprising:
a computer network enabling data communications between a user computer, a merchant computer and an enabling computer;
an access manager located on the user computer, said access manager operative to assess the user computer's possession of proof of a particular action having been taken;
the access manager operable to engage the services of the enabling computer when the user computer does not possess proof of the particular action having been taken;
the enabling computer operable to obtain proof from an authorization service that a required action was taken;
the enabling computer operable to create a suitable digital certificate after obtaining the proof of action and during a secure sockets layer handshake;
the merchant computer operable to receive the suitable digital certificate from the enabling computer and operable to cause the requested content to be made available to the user computer after verifying a signature on the digital certificate is that of an entity authorized to grant access to the requested content; and wherein access manager code located in a internet protocol stack; and wherein the access manager is implemented, at least in part, as a proxy service.

21. The system of claim 20 further comprising:
a digital certificate generator running on the first computer;
an internet aware application running on the second computer;
an HTTP cookie store accessible by the second computer;
an HTTP serving program and an access script service running on the third computer;
wherein the third computer requests the suitable HTTP cookie from the second computer and the second computer requests the suitable digital certificate from the first computer;
wherein the first computer utilizes the digital certificate generator to create a suitable digital certificate after receiving proof from an authorization service that a required action was taken;
wherein the first computer sends a copy of the suitable digital certificate to the access script service via the second computer;
wherein the access script service creates a suitable HTTP cookie which the third computer sends along with the requested content to the internet aware application; and,
wherein the internet aware application stores an image of the HTTP cookie in the HTTP cookie store.

22. A system for selectively granting access to digital content utilizing a digital certificate embodied on a non-transitory computer readable medium comprising:
a computer network enabling data communications between a plurality of computers including a client and a server computer;
an internet aware application running on the client computer;
an access manager running on the client computer;
an internet protocol stack located on the client computer; and the access manager code located in the internet protocol stack;
wherein the access manager is implemented, at least in part, as a proxy service;
a suitable HTTP cookie in an HTTP cookie store of the client;
an HTTP serving program and an access script service running on the server computer wherein the server computer requests a suitable HTTP cookie from the client computer in response to a request initiated by the client computer for particular digital content;
the access manager operable to respond to a request for particular digital content wherein the access manager searches the HTTP cookie store for a suitable HTTP cookie and causes the suitable HTTP cookie to be sent to the HTTP serving program;
wherein if the access manager cannot find a suitable HTTP cookie, the access manager causes the access script service to create a suitable HTTP cookie during a secure sockets layer handshake;
and, wherein, after receiving the suitable HTTP cookie, the HTTP serving program causes the requested content to be made available to the internet aware application.

23. A system for selectively granting access to digital content utilizing a digital certificate embodied on a non-transitory computer readable medium comprising:
a computer network enabling data communications between a plurality of computers;
an access manager configured to search for a suitable digital certificate; a digital certificate generator configured to contemporaneously generate the suitable digital certificate within a secure sockets layer handshake if the access manager cannot find the suitable digital certificate;
a computer of the plurality of computers operable to cause the requested content to be made available to another computer after it verifies a signature on the suitable digital certificate is that of an entity authorized to grant access to the requested content; and
wherein access manager code located in a internet protocol stack; and wherein the access manager is implemented, at least in part, as a proxy service.

24. A system for selectively granting access to digital content utilizing a client tendered digital certificate comprising:
a computer network configured to exchange information among first and second pluralities of computers;
the first plurality of computers including a client computer (client) and a server computer (server);
a secure sockets layer (SSL) handshake is initiated when the client requests particular digital content;
the server and the client configured to exchange digital certificates in a mutual authentication process;
the client digital certificate created by a computer of the second plurality of computers after the SSL handshake is initiated;
wherein the server is operable to cause the requested content to be made available to the client computer when a signature on the client digital certificate signature is verified during mutual authentication as that of an entity authorized to grant access to the requested content; and
an internet protocol stack located on the client computer; and, access manager code located in the internet protocol stack; and
wherein the access manager is implemented, at least in part, as a proxy service.

25. The system of claim 24 wherein particular digital content caused to be made available by the server is not encrypted.

26. A method for selectively granting access to digital content utilizing a digital certificate comprising the steps of:
providing a computer network operable to enable data communications between first and second pluralities of computers;
the first plurality of computers including a client computer (client) and a server computer (server);
an internet protocol stack located on the client computer; and, access manager code located in the internet protocol stack;
wherein the access manager is implemented, at least in part, as a proxy service,
creating a client digital certificate in a computer of the second plurality of computers after the client computer initiates a request for particular digital content, the digital certificate being created during a secure sockets layer handshake between the client and server computers;
including data indicative of the requested content in a data field of the digital certificate; and,
making the requested content available to the client after it verifies a signature on the digital certificate is that of an entity authorized to grant access to the requested content.

27. The method of claim 26 wherein the requested content made available to the client is not encrypted.

* * * * *